US011662856B2

(12) United States Patent
Pundak et al.

(10) Patent No.: US 11,662,856 B2
(45) Date of Patent: *May 30, 2023

(54) ROTATABLY COUPLED TOUCH SCREEN DISPLAYS

(71) Applicant: Microsoft Technology Licensing, LLC, Redmond, WA (US)

(72) Inventors: Gilad Pundak, Rehovot (IL); Zvika Zmiri, Kdumim (IL); Anton Gorbanev, Kiryat Ono (IL); Matan Slassi, Tel Aviv (IL); Dmitry Birenberg, Rosh Ha Ayin (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/447,246

(22) Filed: Sep. 9, 2021

(65) Prior Publication Data

US 2022/0075478 A1    Mar. 10, 2022

Related U.S. Application Data

(63) Continuation of application No. 17/014,661, filed on Sep. 8, 2020, now Pat. No. 11,144,161.

(51) Int. Cl.
*G06F 3/041* (2006.01)
*G06F 3/044* (2006.01)
(Continued)

(52) U.S. Cl.
CPC .......... *G06F 3/0418* (2013.01); *G06F 3/044* (2013.01); *G06F 3/0446* (2019.05);
(Continued)

(58) Field of Classification Search
None
See application file for complete search history.

(56) References Cited

U.S. PATENT DOCUMENTS

| 2008/0309625 | A1* | 12/2008 | Krah | G06F 3/0445 |
| | | | | 345/173 |
| 2009/0127005 | A1* | 5/2009 | Zachut | G06F 3/0446 |
| | | | | 178/18.03 |

(Continued)

FOREIGN PATENT DOCUMENTS

WO    2016209418 A1    12/2016

OTHER PUBLICATIONS

"International Search Report and Written Opinion Issued in PCT Application No. PCT/US21/035077", dated Sep. 21, 2021, 14 Pages.

*Primary Examiner* — Dorothy Harris
(74) *Attorney, Agent, or Firm* — Alleman Hall Creasman & Tuttle LLP

(57) ABSTRACT

Examples are disclosed relating to computing devices and methods for performing capacitive touch detection in rotatably coupled displays. In one example, a method comprises: in a first display, providing a first signal at a first frequency to a first drive electrode in a first frequency region abutting a first non-coupled side opposite to a first coupled side. Other signals at other frequencies are provided to other drive electrodes in other frequency regions. In a second display, a second signal at the first frequency is provided to a second drive electrode located in a different first frequency region abutting a second coupled side opposite to a second non-coupled side. The other frequency regions of the first display are positioned between the first frequency region and the different first frequency region, thereby spatially separating the first frequency region from the different first frequency region.

20 Claims, 9 Drawing Sheets

(51) Int. Cl.
 *G06F 3/14* (2006.01)
 *G06F 1/16* (2006.01)
(52) U.S. Cl.
 CPC .......... *G06F 3/1423* (2013.01); *G06F 1/1618* (2013.01); *G06F 3/04166* (2019.05); *G06F 3/041661* (2019.05)

(56) References Cited

U.S. PATENT DOCUMENTS

| | | | |
|---|---|---|---|
| 2013/0194225 A1* | 8/2013 | Shen | G06F 3/0446 345/174 |
| 2013/0285976 A1* | 10/2013 | Kuo | G06F 3/04182 345/174 |
| 2015/0301577 A1 | 10/2015 | Leigh et al. | |
| 2016/0370912 A1* | 12/2016 | Qiao | G06F 3/04166 |
| 2017/0285837 A1 | 10/2017 | Zeng et al. | |
| 2018/0129341 A1 | 5/2018 | Bae et al. | |
| 2019/0042056 A1 | 2/2019 | Monson et al. | |

\* cited by examiner

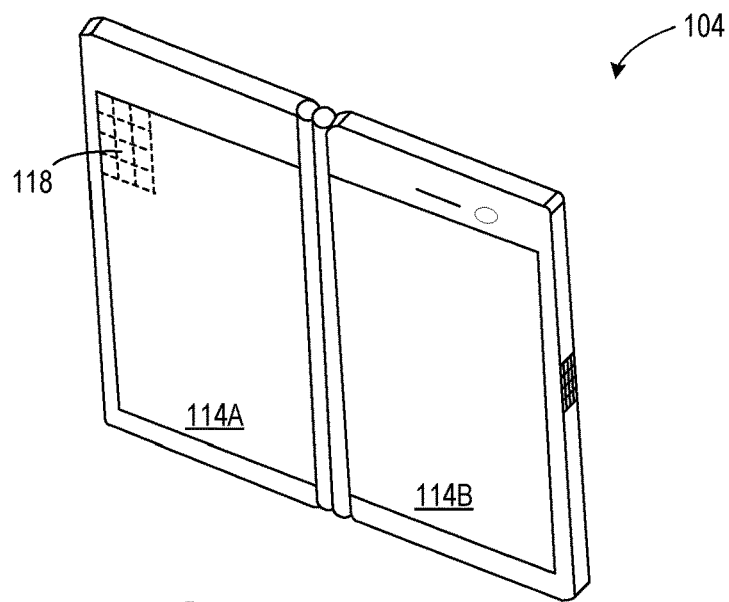
FIG. 1A
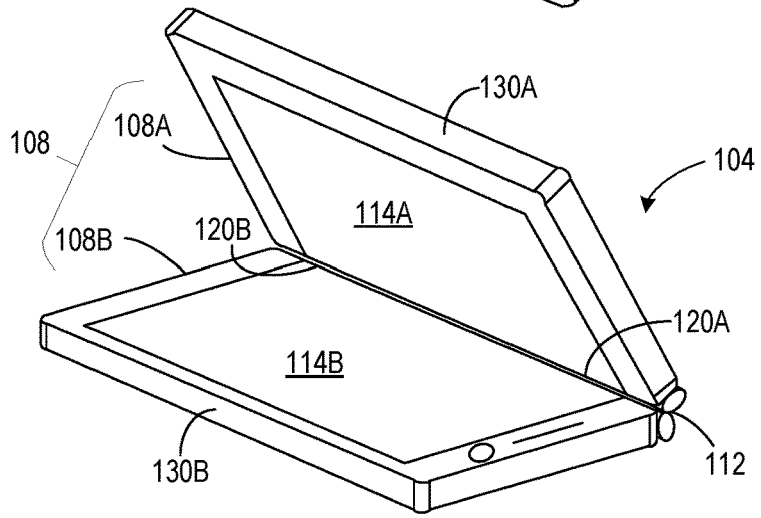
FIG. 1B
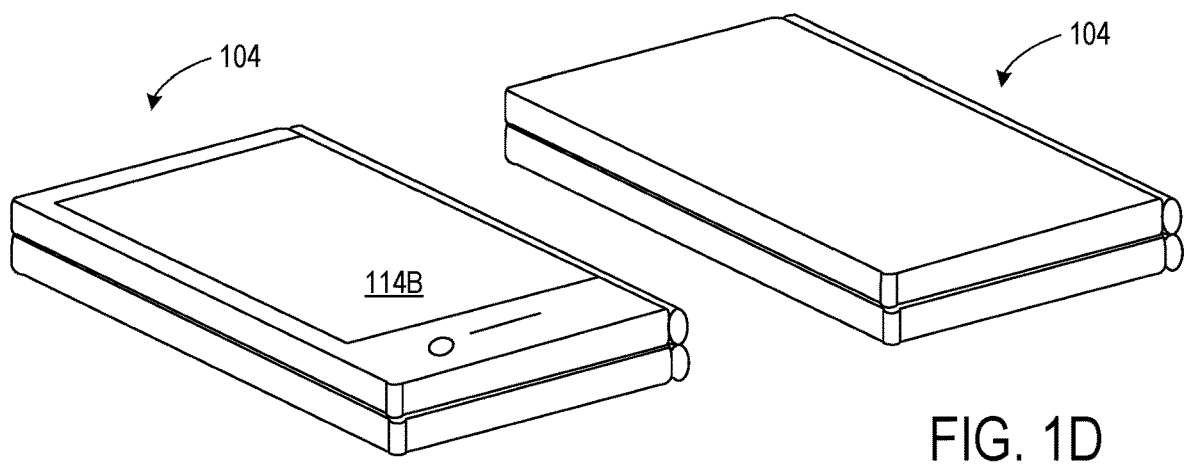
FIG. 1C
FIG. 1D

```
                                                    ┌─ 500
┌─────────────────────────────────────────────────┐
│  AT A FIRST TIME, IN THE FIRST TOUCH SCREEN      │
│  DISPLAY, PROVIDE A FIRST SIGNAL AT A FIRST      │
│  FREQUENCY TO A FIRST DRIVE ELECTRODE IN A       │
│  FIRST FREQUENCY REGION ABUTTING A FIRST         │
│  NON-COUPLED SIDE THAT IS OPPOSITE TO THE        │
│  FIRST COUPLED SIDE 504                          │
└─────────────────────────────────────────────────┘
                         │
                         ▼
┌─────────────────────────────────────────────────┐
│  PROVIDE OTHER SIGNALS AT OTHER FREQUENCIES TO   │
│  OTHER DRIVE ELECTRODES IN OTHER FREQUENCY       │
│  REGIONS OF THE FIRST TOUCH SCREEN DISPLAY,      │
│  WHEREIN THE OTHER FREQUENCY REGIONS ARE         │
│  LOCATED BETWEEN THE FIRST FREQUENCY REGION      │
│  AND THE FIRST COUPLED SIDE 508                  │
│  ┌───────────────────────────────────────────┐   │
│  │ THE FIRST FREQUENCY AND THE OTHER         │   │
│  │ FREQUENCIES ARE EACH A DIFFERENT          │   │
│  │ FREQUENCY 512                             │   │
│  └───────────────────────────────────────────┘   │
│  ┌───────────────────────────────────────────┐   │
│  │ AT THE FIRST TIME AND IN THE FIRST TOUCH  │   │
│  │ SCREEN DISPLAY, PROVIDE A THIRD SIGNAL    │   │
│  │ HAVING THE FIRST FREQUENCY TO ANOTHER     │   │
│  │ DRIVE ELECTRODE IN ONE OF THE OTHER       │   │
│  │ FREQUENCY REGIONS, WHEREIN THE FIRST      │   │
│  │ SIGNAL AND THE THIRD SIGNAL ARE OUT OF    │   │
│  │ PHASE 516                                 │   │
│  └───────────────────────────────────────────┘   │
│  ┌───────────────────────────────────────────┐   │
│  │ WHEREIN THE ONE OF THE OTHER FREQUENCY    │   │
│  │ REGIONS ABUTS THE FIRST FREQUENCY         │   │
│  │ REGION 520                                │   │
│  └───────────────────────────────────────────┘   │
└─────────────────────────────────────────────────┘
                         │
                         ▼
┌─────────────────────────────────────────────────┐
│  IN THE SECOND TOUCH SCREEN DISPLAY, PROVIDE A   │
│  SECOND SIGNAL AT THE FIRST FREQUENCY TO A       │
│  SECOND DRIVE ELECTRODE IN A DIFFERENT FIRST     │
│  FREQUENCY REGION ABUTTING THE SECOND COUPLED    │
│  SIDE THAT IS OPPOSITE TO A SECOND NON-COUPLED   │
│  SIDE OF THE SECOND TOUCH SCREEN DISPLAY 524     │
└─────────────────────────────────────────────────┘
                         │
                         ▼
                        (B)
```

FIG. 5A

```
                                    ┌─ 500
         Ⓑ
         ↓
┌─────────────────────────────────────────────────────────┐
│ PROVIDE ADDITIONAL SIGNALS AT THE OTHER FREQUENCIES TO  │
│  ADDITIONAL DRIVE ELECTRODES IN ADDITIONAL FREQUENCY    │
│ REGIONS OF THE SECOND TOUCH SCREEN DISPLAY, WHEREIN     │
│ THE ADDITIONAL FREQUENCY REGIONS ARE LOCATED BETWEEN    │
│  THE DIFFERENT FIRST FREQUENCY REGION AND THE SECOND    │
│               NON-COUPLED SIDE 528                      │
├─────────────────────────────────────────────────────────┤
│   THE OTHER FREQUENCY REGIONS IN THE FIRST TOUCH        │
│   SCREEN DISPLAY ARE POSITIONED BETWEEN THE FIRST       │
│  FREQUENCY REGION AND THE DIFFERENT FIRST FREQUENCY     │
│   REGION OF THE SECOND TOUCH SCREEN DISPLAY, THEREBY    │
│   SPATIALLY SEPARATING THE FIRST FREQUENCY REGION OF    │
│   THE FIRST TOUCH SCREEN DISPLAY FROM THE DIFFERENT     │
│   FIRST FREQUENCY REGION OF THE SECOND TOUCH SCREEN     │
│                     DISPLAY 532                         │
├─────────────────────────────────────────────────────────┤
│  THE FREQUENCIES PROVIDED TO THE DRIVE ELECTRODES IN    │
│   THE FIRST TOUCH SCREEN DISPLAY ARE A FIRST SET OF     │
│      DIFFERENT FREQUENCIES, AND THE FREQUENCIES         │
│    PROVIDED TO THE DRIVE ELECTRODES IN THE SECOND       │
│   TOUCH SCREEN DISPLAY ARE ALSO THE FIRST SET OF        │
│              DIFFERENT FREQUENCIES 536                  │
├─────────────────────────────────────────────────────────┤
│   WHEREIN THE FIRST FREQUENCY REGION AND THE OTHER      │
│    FREQUENCY REGIONS ARE ORDERED BY FREQUENCY IN        │
│  ASCENDING OR DESCENDING ORDER FROM THE FIRST NON-      │
│   COUPLED SIDE TO THE FIRST COUPLED SIDE OF THE FIRST   │
│    TOUCH SCREEN DISPLAY, AND WHEREIN THE DIFFERENT      │
│       FIRST FREQUENCY REGION AND THE ADDITIONAL         │
│   FREQUENCY REGIONS ARE ORDERED IN A SAME ORDER AS      │
│    THE ORDER OF THE FIRST FREQUENCY REGION AND THE      │
│   OTHER FREQUENCY REGIONS FROM THE SECOND COUPLED       │
│    SIDE TO THE SECOND NON-COUPLED SIDE OF THE SECOND    │
│                 TOUCH SCREEN DISPLAY 540                │
├─────────────────────────────────────────────────────────┤
│  PROVIDING SIGNALS TO ONE DRIVE ELECTRODE AT A TIME IN  │
│    EACH OF THE FREQUENCY REGIONS OF THE FIRST TOUCH     │
│  SCREEN DISPLAY AND THE SECOND TOUCH SCREEN DISPLAY     │
│                          544                            │
└─────────────────────────────────────────────────────────┘
                             ↓
                             Ⓒ

FIG. 5B
```

ROTATABLY COUPLED TOUCH SCREEN DISPLAYS

CROSS REFERENCE TO RELATED APPLICATIONS

This application is a continuation of U.S. patent application Ser. No. 17/014,661, filed Sep. 8, 2020, the entirety of which is hereby incorporated herein by reference for all purposes.

BACKGROUND

Some computing devices include a first touch screen display that is coupled to a second touch screen display. For example, in a dual screen smartphone or laptop, two touch screen displays may be rotatably coupled such that the two displays are movable with respect to one another. However, it can be challenging to balance power efficiency, noise immunity and crosstalk mitigation in such combined touch screen display systems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to computing devices and methods for performing capacitive touch detection in dual screen displays using configurations that conserve power and reduce noise while also minimizing crosstalk. In one example, a method is disclosed for performing capacitive touch detection on a computing device comprising a first touch screen display comprising a first coupled side that is rotatably coupled to a second coupled side of a second touch screen display. The method comprises: at a first time, in the first touch screen display, providing a first signal at a first frequency to a first drive electrode in a first frequency region abutting a first non-coupled side that is opposite to the first coupled side. The method also includes providing other signals at other frequencies to other drive electrodes in other frequency regions of the first touch screen display. The other frequency regions are located between the first frequency region and the first coupled side.

In the second touch screen display, a second signal is provided to a second drive electrode at the first frequency. The second drive electrode is in a different first frequency region abutting the second coupled side that is opposite to a second non-coupled side of the second touch screen display. The method also includes providing additional signals at the other frequencies additional to drive electrodes in additional frequency regions of the second touch screen display. The additional frequency regions are located between the different first frequency region and the second non-coupled side. The other frequency regions in the first touch screen display are positioned between the first frequency region and the different first frequency region of the second touch screen display, thereby spatially separating the first frequency region of the first touch screen display from the different first frequency region of the second touch screen display.

BRIEF DESCRIPTION OF THE DRAWINGS

FIGS. 1A-1D show one example of a computing device according to examples of the present disclosure.

FIGS. 5A-5C show a flow diagram of an example method for performing capacitive touch detection according to examples of the present disclosure.

DETAILED DESCRIPTION

Figure 2:
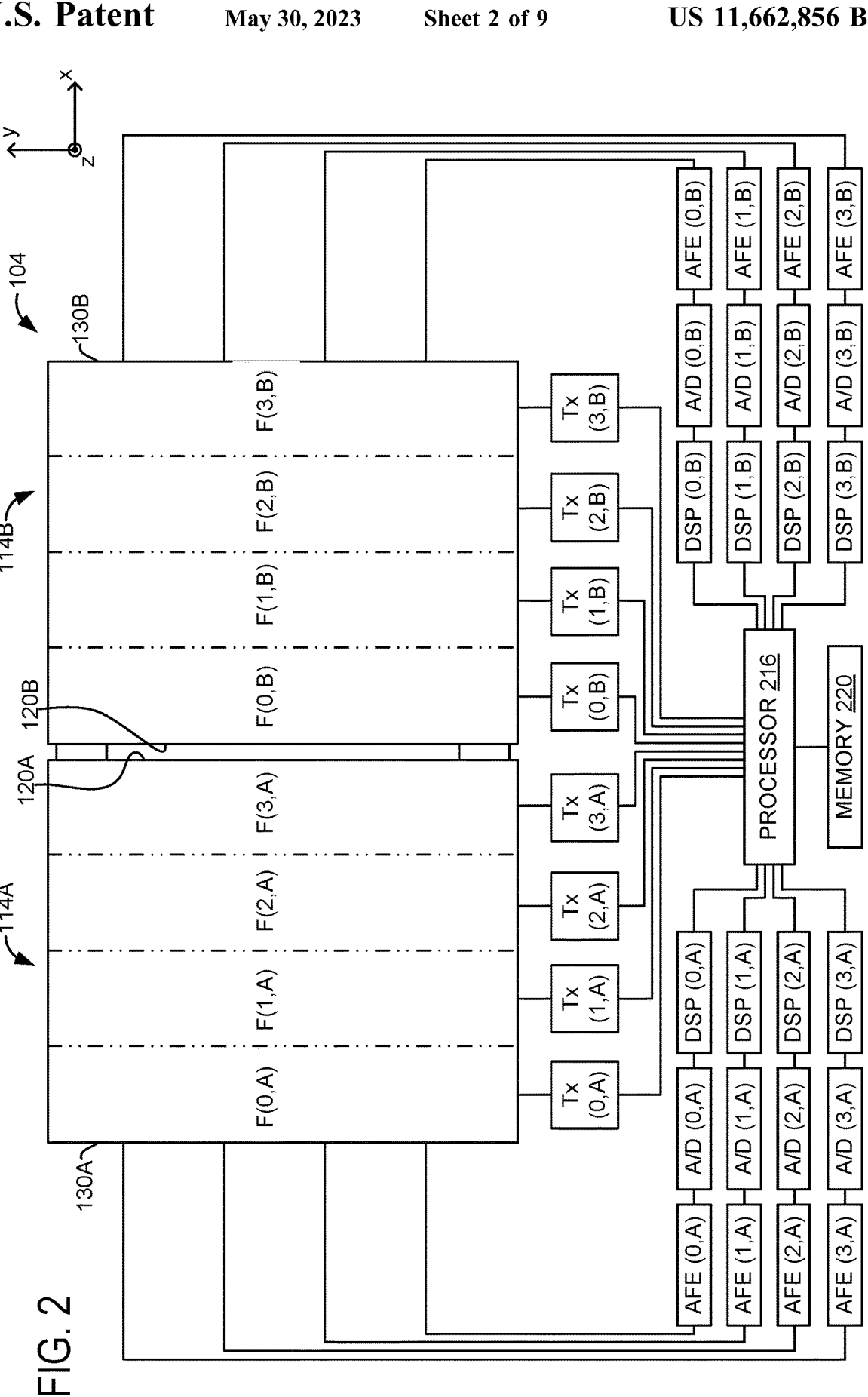
FIG. 2 shows a schematic view of components of the computing device of FIG. 1 including a first touch screen display and second touch screen display according to examples of the present disclosure.

Some computing devices include a first touch screen display that is coupled to a second touch screen display. For example, in a dual screen smartphone or laptop, two touch screen displays may be rotatably coupled such that the two displays are movable with respect to one another. In some examples, both touch screen displays can function together as a larger, combined touch screen display system. However, it can be challenging to power efficiency, noise immunity and crosstalk mitigation in such combined touch screen display systems.

In some examples, the first touch screen display and the second touch screen display are mutual capacitance touch screen displays. In these examples, touch inputs are identified by sampling capacitance between a driving electrode and a sensing electrode. Driving electrodes are arranged in an array within a touch screen display. Signals are provided to each of the electrodes at a different frequency and/or at a different time. Conductive materials, such as a user's finger, draw current away from the driving electrodes when providing a touch input. The touch input can be identified by detecting this current, and a location of the touch input can be reconstructed based on determining which driving electrodes were being driven when the touch input occurred, and the frequency of the signal driving each driving electrode.

On larger displays that include larger numbers of driving electrodes, signals may be provided to the driving electrodes at different times using a greater number of timeslots to detect touch inputs. However, as the number of timeslots increases, the time required to scan all the sensing electrodes in the entire touch sensitive area also increases. Additionally, providing signals to the driving electrodes in a greater number of timeslots consumes more power. Accordingly, and particularly for smaller form factor mobile devices such as smartphones that have limited battery capacity, it is desirable to reduce the number of timeslots utilized to detect touch inputs.

In some examples, signals can be provided to a plurality of driving electrodes at substantially the same time, to thereby reduce the number of timeslots, by dividing the touch screen display into multiple different frequency areas. In some examples, signals having different frequencies are applied to the driving electrodes in each of the different areas. In this manner, power is conserved by using fewer timeslots, and spatial resolution for detecting the location of a touch input is preserved. However, these examples also use more frequencies and thereby create more noise.

In a dual display touch screen device, to reduce the total number of different frequencies and thereby enhance noise immunity, the same frequencies can be used in both displays. However, this can result in crosstalk between the two touch screen displays. For example, in a foldable dual display device, a first touch screen display and a second touch screen display can be rotated such that the displays become physically closer together. In these orientations, crosstalk between electrode(s) in one of the displays and electrode(s) in the other display can negatively impact touch sensing functionality.

Accordingly, examples are disclosed that relate to computing devices and methods for performing capacitive touch detection to reduce crosstalk. In one example and as described in more detail below, a first touch screen display includes a first coupled side that is rotatably coupled to a second coupled side of a second touch screen display. Briefly, at a first time, a first signal is provided to a first drive electrode in the first touch screen display in a first frequency region abutting a first non-coupled side that is opposite to the first coupled side. Other signals at other frequencies are provided to other drive electrodes in other frequency regions of the first touch screen display. The other frequency regions are located between the first frequency region and the first coupled side of the first display.

In the second touch screen display, a second signal at the same first frequency is provided to a second drive electrode. The second drive electrode is in a different first frequency region abutting the second coupled side that is opposite to a second non-coupled side of the second touch screen display. In this configuration, the other frequency regions in the first touch screen display are positioned between the first frequency region and the different first frequency region of the second touch screen display. Accordingly, and as described in more detail below, with this configuration the first frequency region of the first touch screen display is spatially separated from the different first frequency region of the second touch screen display, regardless of the angular orientation of the two displays. Additionally, when the displays are in a folded configuration, adjacent frequency regions in the two displays are separated in the frequency domain. In this manner, crosstalk between electrodes in the two displays can be effectively minimized, while also reducing power consumption and improving noise immunity of the displays.

With reference now to FIGS. 1A-1D, one example of a computing device is illustrated in the form of a dual screen mobile computing device 104. In other examples, the computing device may take the form of a laptop computing device, tablet computing device, or any other suitable computing device. In the example of FIGS. 1A-1D, the mobile computing device 104 includes a housing 108 having a first part 108A and a second part 108B coupled by a hinge 112. The first part 108A includes a first touch screen display 114A and the second part 108B includes a second touch screen display 114B.

In the example of FIGS. 1A-1D, the first touch screen display 114A and the second touch screen display 114B are movable relative to each other. The hinge 112 is configured to permit the first touch screen display 114A and the second touch screen display 114B to rotate 360 degrees between angular orientations from a face-to-face orientation (FIG. 1D) to a back-to-back orientation (FIG. 1C). In other examples, the first touch screen display 114A and the second touch screen display 114B are not capable of rotating a full 360 degrees.

With reference to FIG. 1A, the mobile computing device 104 includes a capacitive touch sensor, such as a capacitive array, that is integrated with each of the first touch screen display 114A and the second touch screen display 114B. FIG. 1A shows a portion of capacitive touch sensor 118 that includes a capacitive grid configured to sense changes in capacitance caused by objects on or near the displays, such as a user's finger, hand, stylus, etc. While the capacitive touch sensor 118 is illustrated in a capacitive grid configuration, it will be appreciated that other types of capacitive touch sensors and configurations may also be used, such as, for example, a capacitive diamond configuration.

With reference now to FIG. 1B, the hinge 112 permits the first touch screen display 114A and the second touch screen display 114B to rotate relative to one another such that an angle between the displays 114A, 114B can be decreased or increased by the user via applying suitable force to the housing 108 of the mobile computing device 104. From the angular orientation shown in FIG. 1B, the first touch screen display 114A and the second touch screen display 114B may be rotated until the displays 114A, 114B reach a back-to-back angular orientation as shown in FIG. 1C or a face-to-face orientation as shown in FIG. 1D.

FIG. 2 shows a schematic illustration of components of the computing device 104, first touch screen display 114A and second touch screen display 114B. The first touch screen display 114A comprises a first coupled side 120A that is rotatably coupled to a second coupled side 120B of the second touch screen display 114B. The first touch screen display 114A also comprises a first non-coupled side 130A that is opposite to the first coupled side 120A. The second touch screen display 114B similarly comprises a second non-coupled side 130B that is opposite to the second coupled side 120B.

As illustrated by example in FIG. 2, the computing device 104 includes a processor 216 and a memory 220 storing instructions executable by the processor. For example, and as described in more detail below, the memory 220 may store instructions executable by the processor 216 to perform capacitive touch sensing using the first touch screen display 114A and the second touch screen display 114B.

To perform capacitive touch sensing, the computing device 104 includes a number of drivers that are configured to provide signals to driving electrodes (not shown in FIG. 2) in the first touch screen display 114A and the second touch screen display 114B. For ease of description and illustrative purposes only, FIG. 2 shows four drivers Tx(0, A), Tx(1,A), Tx(2,A), and Tx(3,A) for the first touch screen display 114A, and four drivers Tx(0,B), Tx(1,B), Tx(2,B), and Tx(3,B) for the second touch screen display 114B. In other examples, fewer or more drivers Tx may be utilized to provide signals to driving electrodes in each of the displays.

As described in more detail below with reference also to FIG. 3, in this example the first touch screen display 114A is divided into four frequency regions F(0,A), F(1,A), F(2, A), and F(3,A) that each correspond to one of the drivers Tx. In this manner, each of the drivers Tx for the first touch screen display 114A is configured to provide signals to one or more driving electrodes in a corresponding frequency region F. In this example, different signal frequencies $f_0$, $f_1$, $f_2$, and $f_3$ are used by the different drivers Tx for the driving electrodes in each of the four different frequency regions.

Likewise, the second touch screen display 114B is divided into four frequency regions F(0,B), F(1,B), F(2,B), and F(3,B) that utilize the same four frequencies $f_0$, $f_1$, $f_2$, and $f_3$ as the first touch screen display 114A. Each of the four frequency regions F(0,B), F(1,B), F(2,B), and F(3,B) corresponds to one of the drivers Tx for the second touch screen display 114B. Each of the drivers Tx for the second touch screen display 114B is likewise configured to provide signals to one or more driving electrodes in its corresponding frequency region F. Accordingly and as noted above, by utilizing the same set of frequencies $f_0$, $f_1$, $f_2$ and $f_3$ for both the first touch screen display 114A and second touch screen display 114B, the overall number of frequencies may be reduced to thereby also reduce exposure to noise.

It will be appreciated that in different examples, the first touch screen display 114A and the second touch screen display 114B may comprise any suitable number of frequency regions F. Also and in different examples, the first touch screen display 114A and the second touch screen display 114B may have the same or different number of frequency regions.

It will also be appreciated that the computing device 104 may utilize any suitable number of drivers Tx configured in any suitable manner. In some examples such as the computing device 104, each frequency region F corresponds to an independent driver Tx. In other examples, each individual driving electrode in a frequency region receives a signal from a separate driver Tx. In yet other examples, one driver Tx can provide signals to driving electrodes in two or more different frequency regions F.

In some examples, the first touch screen display 114A and the second touch screen display 114B are mutual capacitance touch screen displays, in which a touch input is detected by sensing a change in capacitance between a driving electrode and a sensing electrode. In the example of FIG. 2, the computing device 104 is configured to receive an analog signal from one or more sensing electrodes at an analog front end (AFE). The AFE is configured to filter noise and output a filtered analog signal for downstream processing. The filtered analog signal is converted into a digital signal at an analog/digital (A/D) converter. The digital signal is provided to a digital signal processor (DSP) for digital signal processing, such as performing a fast Fourier transform (FFT) and processing the signal in a frequency domain.

In the example of FIG. 2, each frequency region F has a dedicated AFE, A/D converter, and DSP. For example, AFE (0,A) is configured to receive analog signals from one or more sensing electrodes in frequency region F(0,A) and output filtered analog signals to A/D (0,A), which in turn outputs digital signals to DSP (0,A). Similar configurations are provided for each of the other frequency regions. Likewise in the second touch screen display 114B, AFE (0,B) is configured to receive analog signals from one or more sensing electrodes in frequency region F(0,B) and output filtered analog signals to A/D (0,B), which in turn outputs digital signals to DSP (0,B). Similar configurations are provided for each of the other frequency regions in the second touch screen display 114B.

It will also be appreciated that in other examples, the computing device 104 may include any other suitable number of AFEs, A/D converters, and DSPs that are configured in any suitable manner. In some examples, each individual sensing electrode is associated with a dedicated AFE, A/D converter, and DSP. In other examples, one or more of an AFE, A/D converter, and a DSP can receive signals from sensing electrodes in two or more different frequency regions F.

In some examples and as described in more detail below, at a first time each driver Tx provides a signal to one driving electrode in each of the frequency regions of the first touch screen display 114A and the second touch screen display 114B. Signals from corresponding sensing electrodes in each of the frequency regions are then sensed. At a second time after the first time, each driver Tx provides a signal to a different driving electrode in each of the frequency regions of the two displays, and signals from corresponding sensing electrodes are sensed. This process of providing and sensing signals is continued until the entire surfaces of the first touch screen display 114A and the second touch screen display 114B have been scanned, and the process is repeated.

Figure 3:
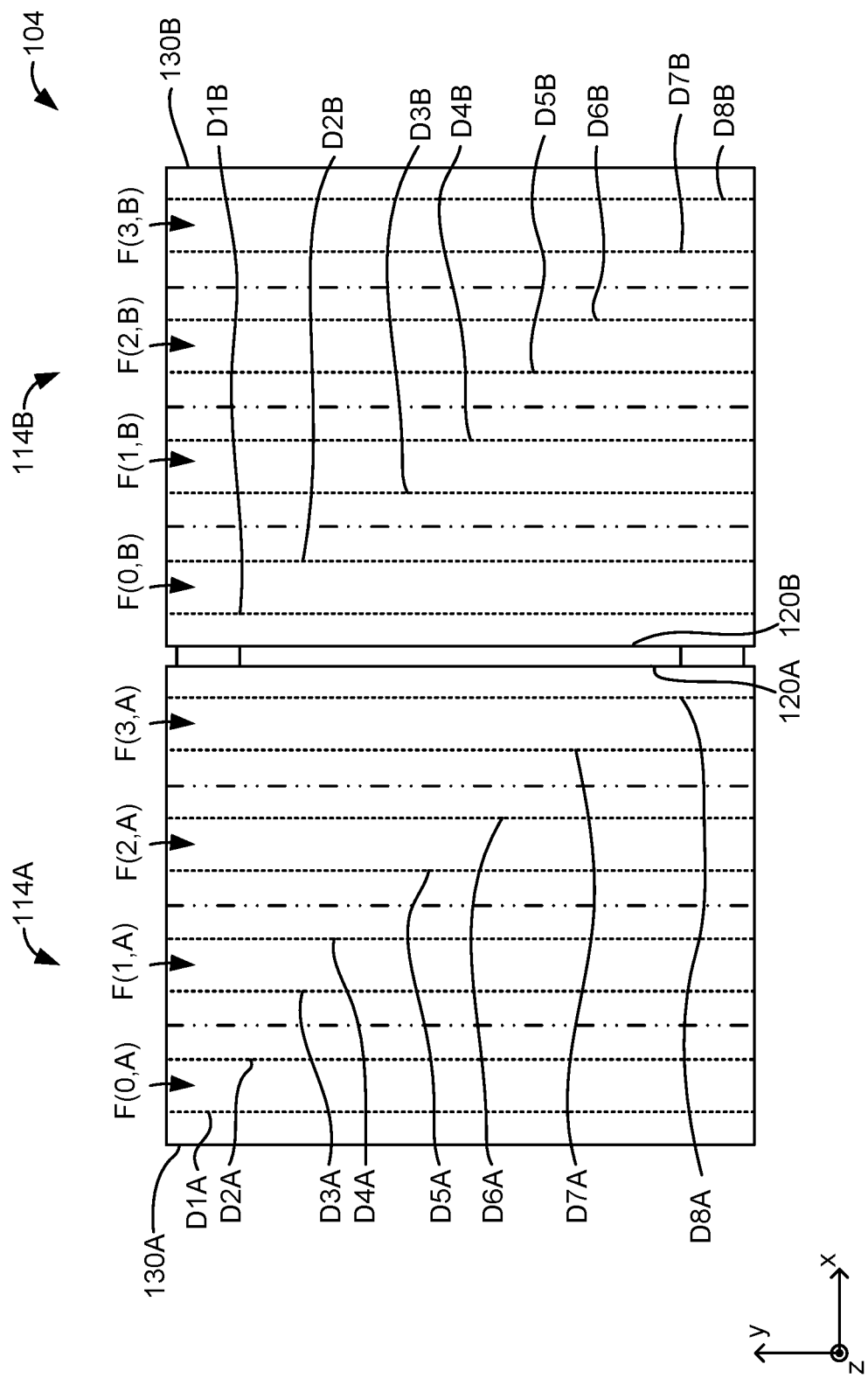
FIG. 3 shows a simplified view of the first touch screen display and the second touch screen display of FIG. 2 according to examples of the present disclosure.

As introduced above and with reference also to FIG. 3, the frequency regions of the first touch screen display 114A and the second touch screen display 114B are configured to support power-efficient and noise immune touch detection on both displays 114A, 114B, while also avoiding cross-talk between the displays. More particularly and as described in more detail below, the different frequencies utilized in the frequency regions are ordered spatially across the width of each display in the x-axis direction to provide physical separation between electrodes receiving signals at the same frequency in the two displays, regardless of the relative orientation of the two displays. Additionally, and as described further below with reference to FIGS. 4A-4C, the particular spatial ordering of the frequencies ensures that when the computing device 104 is in a folded configuration, adjacent frequency regions in the two displays are separated as much as possible in the frequency domain.

As illustrated by example in FIGS. 2 and 3, in the first touch screen display 114A the first frequency region F(0,A) abuts the first non-coupled side 130A of the display. The other frequency regions F(1,A), F(2,A), and F(3,A) of the first touch screen display 114A are located between the first frequency region F(0,A) and the first coupled side 120A.

The second touch screen display 114B also includes a different first frequency region F(0,B) that utilizes the same frequency $f_0$ as the first frequency region F(0,A) of the first touch screen display 114A. The different first frequency region F(0,B) abuts the second coupled side 120B that is opposite to the second non-coupled side 130B of the second touch screen display 114B. Additional frequency regions F(1,B), F(2,B), F(3,B) are located between the different first frequency region F(0,B) and the second non-coupled side 130B of the second touch screen display 114B.

As illustrated by example in FIGS. 2 and 3, the other frequency regions F(1,A), F(2,A), F(3,A) of the first touch screen display 114A are positioned laterally between the first frequency region F(0,A) and the different first frequency region F(0,B) of the second touch screen display 114B. Advantageously, this lateral spacing between the two first frequency regions F(0,A) and F(0,B) is present regardless of the angular orientation of the first touch screen display 114A with respect to the second touch screen display 114B (e.g., as the two displays pivot about hinge 112 relative to one another). In this manner, and in one potential advantage of this configuration, the first frequency region F(0,A) of the first touch screen display 114A is spatially separated from the different first frequency region F(0,B) of the second touch screen display 114B, and remains separated regardless of the relative angular orientation between the two displays. Likewise and as described in more detail below, the other frequency regions F(1,A), F(2,A), F(3,A) of the first touch screen display 114A are each spatially separated from a corresponding frequency region F(1,B), F(2,B), or F(3,B) of the second touch screen display 114B.

As described in more detail below, the spatial separation of the frequency regions in the two displays provides a configuration that mitigates crosstalk between electrodes in the two displays. Additionally, in some examples the ordering of the different frequencies in each of the displays also operates to mitigate crosstalk between the electrodes. With reference again to FIG. 3 and as noted above, each of the frequency regions F includes at least one drive electrode D. For example, the simplified example of FIG. 3 shows that frequency region F(0,A) includes drive electrodes MA and D2A; frequency region F(1,A) includes drive electrodes D3A and D4A; frequency region F(2,A) includes drive electrodes D5A and D6A; and frequency region F(3,A) includes drive electrodes D7A and D8A. Likewise, in the second touch screen display 114B, the frequency region F(0,B) includes drive electrodes D1B and D2B; the frequency region F(1,B) includes drive electrodes D3B and D4B; the frequency region F(2,B) includes drive electrodes D5B and D6B; and the frequency region F(3,B) includes drive electrodes D7B and D8B. In different examples each of the frequency regions F may include any suitable number of drive electrodes.

The drive electrodes MA and D2A in the frequency region F(0,A) are configured to receive a signal having a first frequency $f_0$. Likewise, the drive electrodes D1B and D2B in the frequency region F(0,B) are configured to receive a signal having the same first frequency $f_0$. As described above, each of the drive electrodes D in one frequency region F are provided signals at different times to reduce signal interference and avoid ambiguity, thereby enabling the accurate location of a touch input within a single frequency region. The drive electrodes D in the other frequency regions F are configured to receive signals having one or more properties that are different from the signal used to charge the drive electrodes in the frequency regions F(0,A) and F(0,B). For example, the signals used for the drive electrodes D in other frequency regions F may differ in one or more of frequency and phase.

In some examples as noted above, the drive electrodes in the frequency region F(0,A) and the drive electrodes in the frequency region F(0,B) receive signals having the same frequency $f_0$. In some examples, the drive electrodes in the frequency regions F(1,A) and F(1,B) receive signals at a frequency $f_1$, the drive electrodes in the frequency regions F(2,A) and F(2,B) receive signals at a frequency $f_2$, and the drive electrodes in the frequency regions F(1,A) and F(1,B) receive signals at a frequency $f_3$, where $f_0$, $f_1$, $f_2$, and $f_3$ are different frequencies. In different examples, frequencies $f_0$, $f_2$, and $f_3$ can fall within the range of approximately 100 kHz-120 kHz. It will also be appreciated that other suitable frequencies may be used. Adjacent frequency regions may utilize frequencies that are spaced by approximately 2.5 kHz, 5 kHz, or other suitable spacing. As one example, $f_0$, $f_1$, $f_2$, and $f_3$ are 100 kHz, 105 kHz, 110 kHz, and 115 kHz, respectively.

Figure 4A:
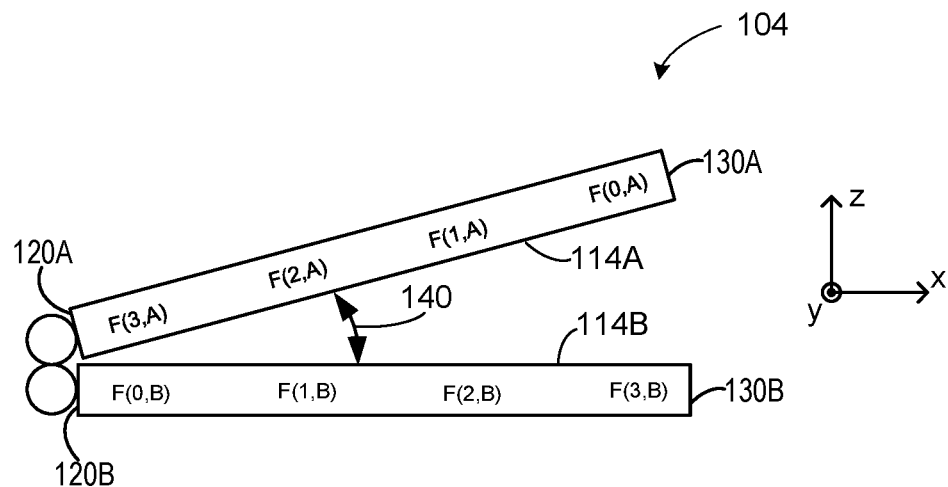
FIGS. 4A-4C show additional views of the first touch screen display and second touch screen display in different orientations according to examples of the present disclosure.
Figure 4B:
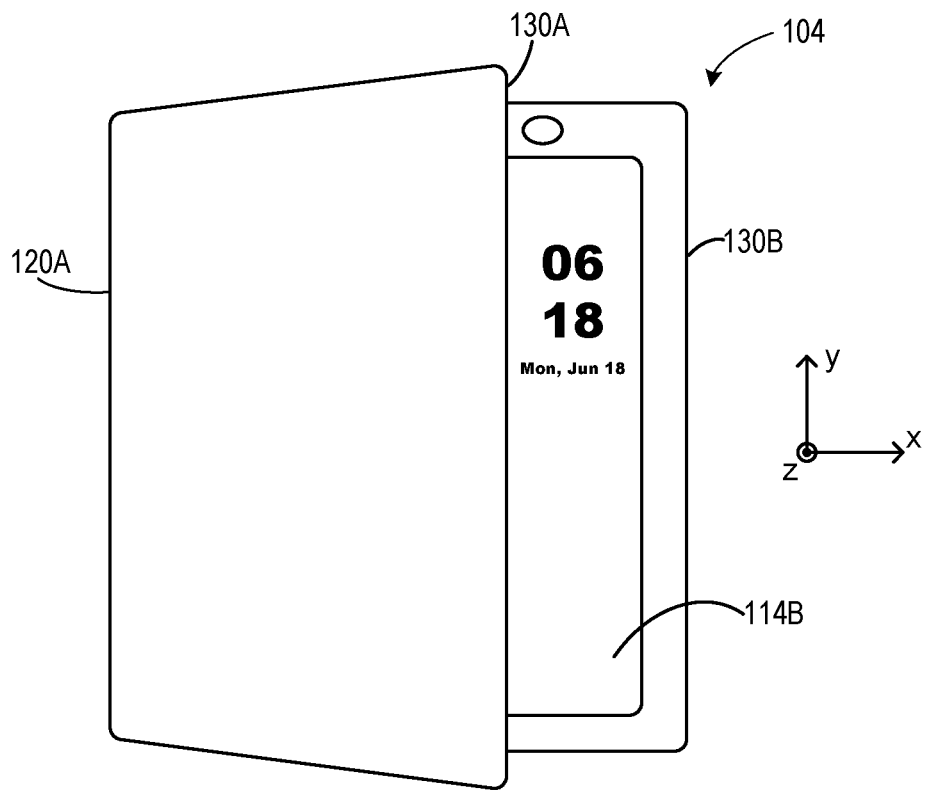
Figure 4C:
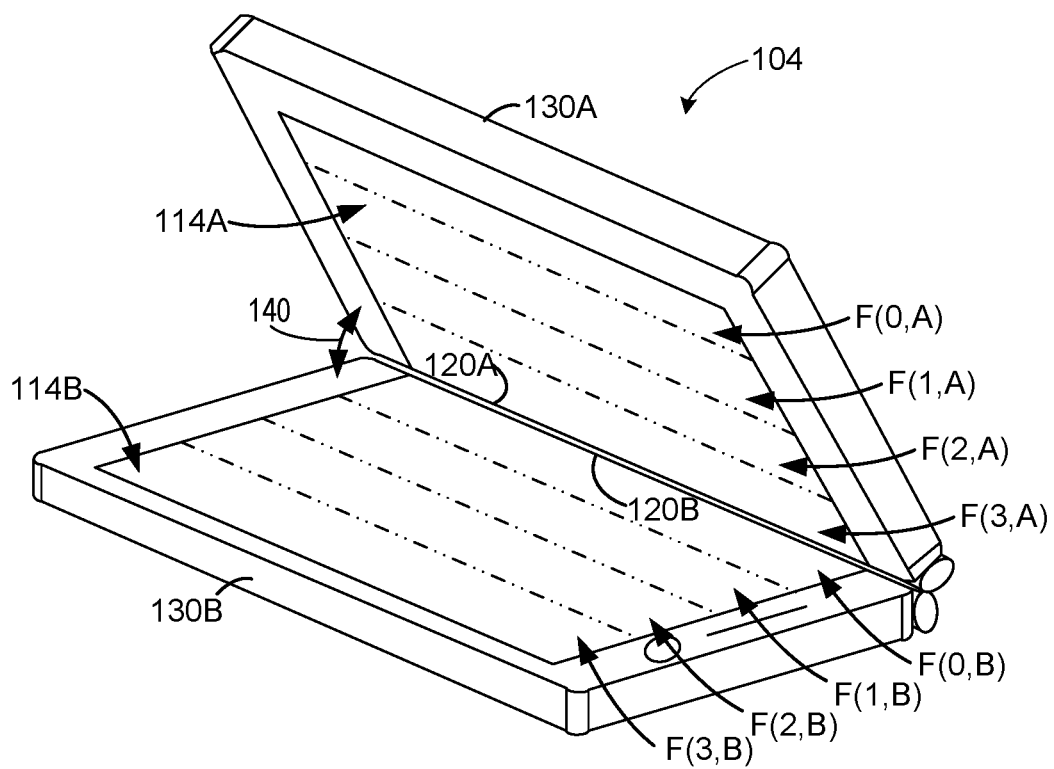

In some examples and as noted above, the particular spatial ordering of frequencies across the displays ensures that when the computing device 104 is in a folded configuration, adjacent frequency regions in the two displays are separated in the frequency domain, and frequency regions utilizing the same frequency are physically distanced. With reference now to FIGS. 4A-4C, in some use case scenarios a user may desire to partially open the device and perform a quick action, such as reading a text or checking the time and date. In these examples the angle 140 between the first touch screen display 114A and second touch screen display 114B may be relatively smaller, such as 45 degrees or less. As shown in FIG. 4A, as the angle 140 is reduced, the frequency regions in the first touch screen display 114A are moved closer to the frequency regions in second touch screen display 114B.

Advantageously, and to mitigate the potential for crosstalk between electrodes in these orientations of the displays, in some examples the frequency regions in both displays are spatially arranged by frequency in an ascending or descending order. As explained further below, this ordering by frequency provides separation in the frequency domain between adjacent frequency regions as the angle 140 grows smaller, and creates physical distance between frequency regions utilizing the same frequency. More particularly and with reference also to FIG. 3, in one example in the first touch screen display 114A, the first frequency region F(0,A) and the other frequency regions F(1,A), F(2,A), and F(3,A) are ordered by frequency in an ascending order from the first non-coupled side 130A to the first coupled side 120A, such that $f_0 < f_1 < f_2 < f_3$. In the second touch screen display 114B, the different first frequency region F(0,B) and the additional frequency regions F(1,B), F(2,B), and F(3,B) are also ordered by frequency in the same ascending order from the second coupled side 120B to the second non-coupled side 130B, such that $f_0 < f_1 < f_2 < f_3$.

In another example in the first touch screen display 114A, the first frequency region F(0,A) and the other frequency regions F(1,A), F(2,A), and F(3,A) are ordered by frequency in a descending order from the first non-coupled side 130A to the first coupled side 120A, such that $f_0 < f_1 < f_2 < f_3$. In the second touch screen display 114B, the different first frequency region F(0,B) and the additional frequency regions F(1,B), F(2,B), and F(3,B) are also ordered by frequency in the same descending order from the second coupled side 120B to the second non-coupled side 130B, such that $f_0 < f_1 < f_2 < f_3$.

With reference again to FIG. 4A, as the angle 140 is reduced the first frequency region F(0,A) (using frequency $f_0$) moves closer to the frequency region F(3,B) (using frequency $f_3$), and the frequency region F(3,A) (using frequency $f_3$) moves closer to the frequency region F(0,B) (using frequency $f_3$). Advantageously, by ordering the frequency regions of the two displays in ascending or descending order, these physically adjacent frequency regions are separated as much as possible in the frequency domain of the set of frequencies used by both displays. This configuration also provides frequency domain separation for the other frequency regions in both displays.

Additionally and as shown in FIG. 4A, when the computing device 104 is in a folded configuration, the first frequency region F(0,A) (using frequency $f_0$) and the different first frequency region F(0,B) (also using frequency $f_0$) are laterally spaced from one another along the x-axis. In the same manner, the frequency region F(3,A) (using frequency $f_3$) and the additional frequency region F(3,B) (also using frequency $f_3$) are laterally spaced from one another along the x-axis. Further, these frequency regions that use the same frequency are located at opposite ends of their respective displays. Accordingly, this configuration also provides significant spatial separation for these frequency regions in the two displays that are using the same frequency. Additionally, this separation is maintained regardless of the angular orientation of the two displays. The other frequency regions F(2,A) and F(1,A) are also spatially separated from their counterpart frequency regions using the same frequency in the second touch screen display 114B. In this manner and with this configuration, when the computing device 104 is in a folded configuration, adjacent frequency regions will be separated as much as possible in the frequency domain. Accordingly, crosstalk between the two displays can be effectively mitigated or avoided.

In other examples and to further reduce the total number of frequencies utilized, two or more of the frequency regions in a single display may utilize the same frequency by phase shifting their signals. For example and with reference again to FIG. 3, drive electrode D1A in the frequency region F(0,A) is provided with signal $s_0$ having a frequency $f_0$. At the same time drive electrode D3A in adjacent frequency region F(1,A) is provided with signal $s_1$ having the same frequency $f_0$. To avoid ambiguity and enable the computing device 104 to distinguish between signals $s_0$ and $s_1$, the signals $s_0$ and $s_1$ are generated out of phase with each other. In one example, signals $s_0$ and $s_1$ are generated orthogonal to one another. In other examples the signals $s_0$ and $s_2$ may have other suitable phase shifts that allow the computing device 104 to accurately distinguish between capacitive touch inputs associated with the different signals. In this manner, the total number of frequencies utilized by the two displays is further reduced.

Figure 5C:
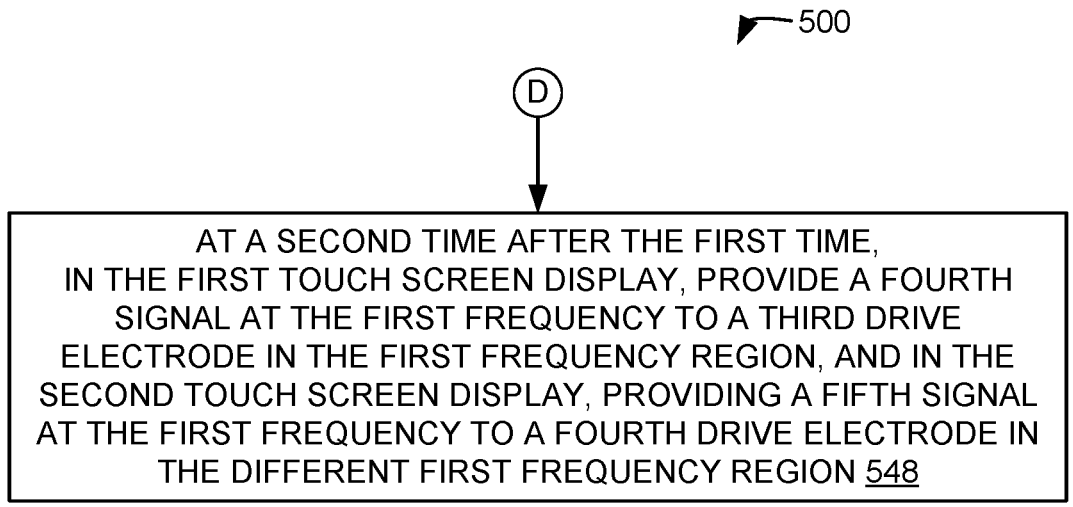

With reference now to FIGS. 5A-5C, a flow diagram is illustrated depicting an example method 500 for performing capacitive touch detection in a computing device that includes a first touch screen display having a first coupled side that is rotatably coupled to a second coupled side of a second touch screen display. The following description of method 500 is provided with reference to the software and hardware components described herein and shown in FIGS. 1-4 and 6. For example, the method 500 may be performed by the computing device 104, hardware, software, and/or firmware of the computing device 104, or a suitable combination of components described herein.

It will be appreciated that following description of method 500 is provided by way of example and is not meant to be limiting. Therefore, it is to be understood that method 500 may include additional and/or alternative steps relative to those illustrated in FIGS. 5A-5C. Further, it is to be understood that the steps of method 500 may be performed in any suitable order. Further still, it is to be understood that one or more steps may be omitted from method 500 without departing from the scope of this disclosure. It will also be appreciated that method 500 also may be performed in other contexts using other suitable components.

With reference to FIG. 5A, at 504 the method 500 includes, at a first time in a first touch screen display, providing a first signal at a first frequency to a first drive electrode in a first frequency region abutting a first non-coupled side that is opposite to a first coupled side. At 508, the method 500 includes, also at the first time and in the first touch screen display, providing other signals at other frequencies to other drive electrodes in other frequency regions, wherein the other frequency regions are located between the first frequency region and the first coupled side.

At 512, the method 500 includes, wherein the first frequency and the other frequencies are each a different frequency. At 516, the method 500 includes at the first time and in the first touch screen display, providing a third signal having the first frequency to another drive electrode in one of the other frequency regions, wherein the first signal and the third signal are out of phase. At 520, the method 500 includes, wherein the one of the other frequency regions abuts the first frequency region. At 524, the method 500 includes, at the first time and in the second touch screen display, providing a second signal at the first frequency to a second drive electrode in a different first frequency region abutting the second coupled side that is opposite to a second non-coupled side of the second touch screen display.

With reference now to FIG. 5B, at 528, the method 500 includes providing additional signals at the other frequencies to additional drive electrodes in additional frequency regions of the second touch screen display, wherein the additional frequency regions are located between the different first frequency region and the second non-coupled side. At 532, the method 500 includes, wherein the other frequency regions in the first touch screen display are positioned between the first frequency region and the different first frequency region of the second touch screen display, thereby spatially separating the first frequency region of the first touch screen display from the different first frequency region of the second touch screen display.

At 536, the method 500 includes, wherein the frequencies provided to the drive electrodes in the first touch screen display are a first set of different frequencies, and the frequencies provided to the drive electrodes in the second touch screen display are also the first set of different frequencies. At 540, the method 500 includes, wherein the first frequency region and the other frequency regions are ordered by frequency in ascending or descending order from the first non-coupled side to the first coupled side of the first touch screen display, and wherein the different first frequency region and the additional frequency regions are ordered in a same order as the order of the first frequency region and the other frequency regions from the second coupled side to the second non-coupled side of the second touch screen display. At 544, the method 500 includes providing signals to one drive electrode at a time in each of the frequency regions of the first touch screen display and the second touch screen display.

With reference now to FIG. 5C, at 548, the method 500 includes, at a second time after the first time, in the first touch screen display, providing a fourth signal at the first frequency to a third drive electrode in the first frequency region, and in the second touch screen display, providing a fifth signal at the first frequency to a fourth drive electrode in the different first frequency region.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
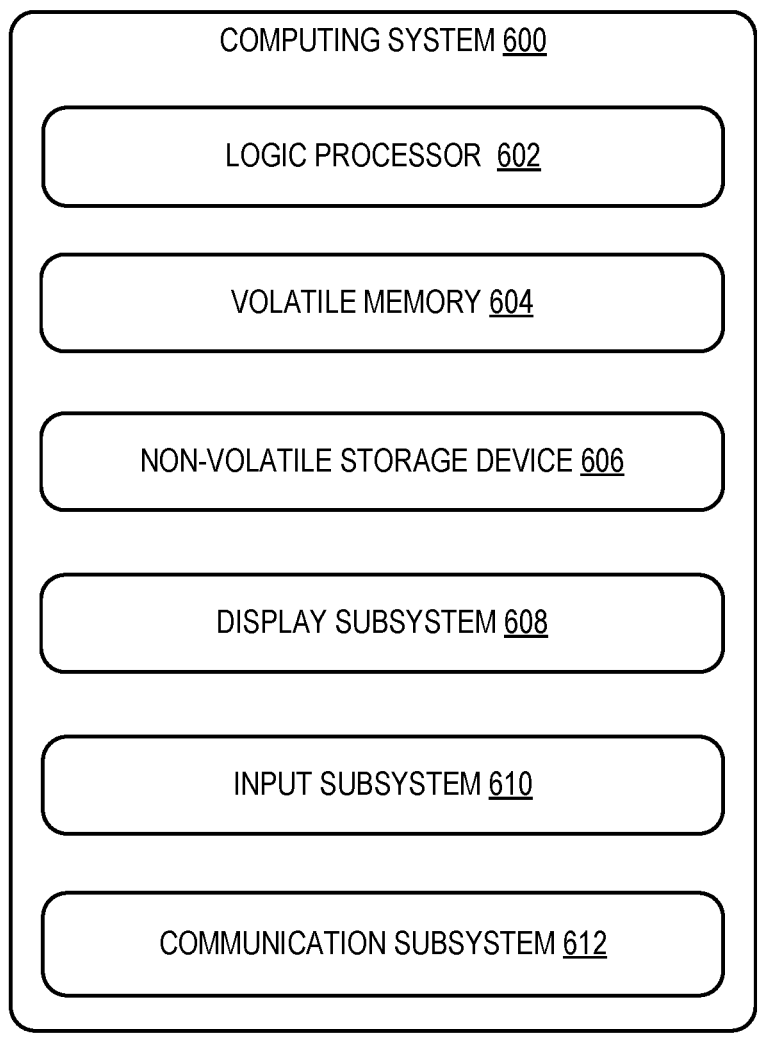
FIG. 6 shows a block diagram of an example computing system according to examples of the present disclosure

FIG. 6 schematically shows a non-limiting embodiment of a computing system 600 that can enact one or more of the methods and processes described above. Computing system 600 is shown in simplified form. Computing system 600 may take the form of one or more personal computers, server computers, tablet computers, home-entertainment computers, gaming devices, mobile computing devices, mobile communication devices (e.g., smart phone), wearable computing devices, and/or other computing devices. The computing device 104 described above and illustrated in FIG. 1A-1D may comprise computing system 600 or one or more aspects of computing system 600.

Computing system 600 includes a logic processor 602, volatile memory 604, and a non-volatile storage device 606. Computing system 600 may optionally include a display subsystem 608, input subsystem 610, communication subsystem 612, and/or other components not shown in FIG. 6.

Logic processor 602 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 602 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Volatile memory 604 may include physical devices that include random access memory (RAM). Volatile memory 604 is typically utilized by logic processor 602 to temporarily store information during processing of software instructions. It will be appreciated that volatile memory 604 typically does not continue to store instructions when power is cut to the volatile memory 604.

Non-volatile storage device 606 includes one or more physical devices configured to hold instructions executable by the logic processors to implement the methods and processes described herein. When such methods and processes are implemented, the state of non-volatile storage device 606 may be transformed—e.g., to hold different data.

Non-volatile storage device 606 may include physical devices that are removable and/or built-in. Non-volatile storage device 606 may include optical memory (e.g., CD, DVD, HD-DVD, Blu-Ray Disc, etc.), semiconductor memory (e.g., ROM, EPROM, EEPROM, FLASH memory, etc.), magnetic memory (e.g., hard-disk drive, floppy-disk drive, tape drive, MRAM, etc.), and/or other mass storage device technology. Non-volatile storage device 606 may include nonvolatile, dynamic, static, read/write, read-only, sequential-access, location-addressable, file-addressable, and/or content-addressable devices. It will be appreciated that non-volatile storage device 606 is configured to hold instructions even when power is cut to the non-volatile storage device 606.

Aspects of logic processor 602, volatile memory 604, and non-volatile storage device 606 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 typically implemented in software by a processor to perform a particular function using portions of volatile memory, which function involves transformative processing that specially configures the processor to perform the function. Thus, a module, program, or engine may be instantiated via logic processor 602 executing instructions held by non-volatile storage device 606, using portions of volatile memory 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 608 may be used to present a visual representation of data held by non-volatile storage device 606. As the herein described methods and processes change the data held by the non-volatile storage device, and thus transform the state of the non-volatile storage device, the state of display subsystem 608 may likewise be transformed to visually represent changes in the underlying data. Display subsystem 608 may include one or more display devices utilizing virtually any type of technology. Such display devices may be combined with logic processor 602, volatile memory 604, and/or non-volatile storage device 606 in a shared enclosure, or such display devices may be peripheral display devices.

When included, input subsystem 610 may comprise or interface with one or more user-input devices such as a keyboard, mouse, touch screen, electronic pen, stylus, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 612 may be configured to communicatively couple various computing devices described herein with each other, and with other devices. Communication subsystem 612 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 600 to send and/or receive messages to and/or from other devices via a network such as the Internet.

The following paragraphs provide additional support for the claims of the subject application. One aspect provides, on a computing device comprising a first touch screen display comprising a first coupled side that is rotatably coupled to a second coupled side of a second touch screen display, a method for performing capacitive touch detection to reduce crosstalk, the method comprising: at a first time: in the first touch screen display, providing a first signal at a first frequency to a first drive electrode in a first frequency region abutting a first non-coupled side that is opposite to the first coupled side, and providing other signals at other frequencies to other drive electrodes in other frequency regions of the first touch screen display, wherein the other frequency regions are located between the first frequency region and the first coupled side; and in the second touch screen display, providing a second signal at the first frequency to a second drive electrode in a different first frequency region abutting the second coupled side that is opposite to a second non-coupled side of the second touch screen display, and providing additional signals at the other frequencies go additional drive electrodes in additional frequency regions of the second touch screen display, wherein the additional frequency regions are located between the different first frequency region and the second non-coupled side, wherein the other frequency regions in the first touch screen display are positioned between the first frequency region and the different first frequency region of the second touch screen display, thereby spatially separating the first frequency region of the first touch screen display from the different first frequency region of the second touch screen display.

The method may additionally or alternatively include, wherein the first frequency and the other frequencies are each a different frequency. The method may additionally or alternatively include, at the first time and in the first touch screen display, providing a third signal having the first frequency to another drive electrode in one of the other frequency regions of the first touch screen display, wherein the first signal and the third signal are out of phase. The method may additionally or alternatively include, wherein the one of the other frequency regions abuts the first frequency region.

The method may additionally or alternatively include, at a second time after the first time, in the first touch screen display, providing a fourth signal at the first frequency to a third drive electrode in the first frequency region, and in the second touch screen display, providing a fifth signal at the first frequency to a fourth drive electrode in the different first frequency region. The method may additionally or alternatively include, wherein the frequencies provided to the drive electrodes in the first touch screen display are a first set of different frequencies, and the frequencies provided to the drive electrodes in the second touch screen display are also the first set of different frequencies. The method may additionally or alternatively include, wherein the first frequency region and the other frequency regions are ordered by frequency in ascending or descending order from the first non-coupled side to the first coupled side of the first touch screen display, and wherein the different first frequency region and the additional frequency regions in the second touch screen display are ordered by frequency in a same order as the order of the first frequency region and the other frequency regions from the second coupled side to the second non-coupled side of the second touch screen display. The method may additionally or alternatively include providing signals to one drive electrode at a time in each of the frequency regions of the first touch screen display and the second touch screen display.

Another aspect provides, on a computing device comprising a first touch screen display comprising a first coupled side that is rotatably coupled to a second coupled side of a second touch screen display, a method comprising: at a first time: in the first touch screen display, providing a first signal at a first frequency to a first drive electrode in a first frequency region abutting a first non-coupled side opposite to the first coupled side of the first touch screen display, and providing other signals at other frequencies to other drive electrodes in other frequency regions; and in the second touch screen display, providing a second signal at the first frequency a second drive electrode in a different first frequency region abutting the second coupled side that is opposite to a second non-coupled side of the second touch screen display, and providing additional signals at the other frequencies to additional drive electrodes in additional frequency regions, wherein the first frequency region and the other frequency regions are ordered by frequency in ascending or descending order from the first non-coupled side to the first coupled side of the first touch screen display, and wherein the different first frequency region and the additional frequency regions in the second touch screen display are ordered by frequency in a same order as the order of the first frequency region and the other frequency regions from the second coupled side to the second non-coupled side of the second touch screen display.

The method may additionally or alternatively include, wherein the first frequency and the other frequencies are each a different frequency. The method may additionally or alternatively include, at the first time and in the first touch screen display, providing a third signal having the first frequency to another drive electrode in one of the other frequency regions of the first touch screen display, wherein the first signal and the third signal are out of phase. The method may additionally or alternatively include, wherein the one of the other frequency regions abuts the first frequency region.

The method may additionally or alternatively include, at a second time after the first time, in the first touch screen display, providing a fourth signal at the first frequency to a third drive electrode in the first frequency region, and in the second touch screen display, providing a fifth signal at the first frequency to a fourth drive electrode in the different first frequency region. The method may additionally or alternatively include, wherein the frequencies provided to the drive electrodes in the first touch screen display are a first set of different frequencies, and the frequencies provided to the drive electrodes in the second touch screen display are also the first set of different frequencies. The method may additionally or alternatively include providing signals to one drive electrode at a time in each of the frequency regions of the first touch screen display and the second touch screen display.

Another aspect provides a computing device, comprising: a processor; a memory storing instructions executable by the processor; a first touch screen display comprising, a first coupled side and a first non-coupled side that is opposite to the first coupled side, a first frequency region abutting the first non-coupled side, a first drive electrode in the first frequency region, other frequency regions located between the first frequency region and the first coupled side, and other drive electrodes in the other frequency regions; and a second touch screen display comprising, a second coupled side and a second non-coupled side that is opposite to the second coupled side, a different first frequency region abutting the second coupled side, a second drive electrode in the different first frequency region, additional frequency regions located between the different first frequency region and the second non-coupled side, and additional drive electrodes in the additional frequency regions; wherein the first coupled side of the first touch screen display is rotatably coupled to the second coupled side of the second touch screen display; and wherein the other frequency regions in the first touch screen display are positioned between the first frequency region in the first touch screen display and the different first frequency region of the second touch screen display, thereby spatially separating the first frequency region of the first touch screen display from the different first frequency region of the second touch screen display.

The computing device may additionally or alternatively include, wherein the instructions are executable to: provide a first signal at a first frequency to the first drive electrode in the first frequency region of the first touch screen display; provide other signals at other frequencies to the other drive electrodes in the other frequency regions of the first touch screen display; provide a second signal at the first frequency to the second drive electrode in the different first frequency region of the second touch screen display; and provide additional signals at the other frequencies to the additional drive electrodes in the additional frequency regions of the second touch screen display.

The computing device may additionally or alternatively include, wherein the first frequency and the other frequencies are each a different frequency. The computing device may additionally or alternatively include, wherein the instructions are executable to, at the first time and in the first touch screen display, provide a third signal having the first frequency to another drive electrode in one of the other frequency regions, wherein the first signal and the third signal are out of phase. The computing device may additionally or alternatively include, wherein the frequencies provided to the drive electrodes in the first touch screen display are a first set of different frequencies, and the frequencies provided to the drive electrodes in the second touch screen display are also the first set of different frequencies.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. On a computing device comprising a first touch screen display comprising a first coupled side that is rotatably coupled to a second coupled side of a second touch screen display, a method for performing capacitive touch detection to reduce crosstalk, the method comprising:
  at a first time:
    in the first touch screen display, providing a first signal having a first property to a first drive electrode in a first frequency region, and providing another signal having a second property different from the first property to another drive electrode in another frequency region of the first touch screen display that is located between the first frequency region and the first coupled side; and
    in the second touch screen display, providing a second signal having the second property to a second drive electrode in a different frequency region, and providing an additional signal having the first property to an additional drive electrode in an additional frequency region of the second touch screen display that is located between the different frequency region and the second coupled side.

2. The method of claim 1, wherein the first frequency region and the another frequency region are adjacent to one another.

3. The method of claim 1, wherein the first property is a first phase and the second property is a second phase different from the first phase.

4. The method of claim 3, wherein the first signal is provided at a first frequency and the another signal is provided at the first frequency.

5. The method of claim 3, wherein first signal is provided at a first frequency, and the another signal is provided at a different frequency.

6. The method of claim 3, wherein the first phase is orthogonal to the second phase.

7. The method of claim 3, wherein frequencies provided to the drive electrodes in the first touch screen display are a first set of different frequencies, and frequencies provided to the drive electrodes in the second touch screen display are also the first set of different frequencies.

8. The method of claim 7, wherein at least the first frequency region and the another frequency region are ordered by frequency in ascending or descending order from the first non-coupled side to the first coupled side of the first touch screen display, and
  wherein at least the different frequency region and the additional frequency region in the second touch screen display are ordered by frequency in a same order as the order of the first frequency region and the another frequency region from the second coupled side to the second non-coupled side of the second touch screen display.

9. The method of claim 1, wherein the first frequency region abuts a first non-coupled side that is opposite to the first coupled side of the first touch screen display, and the different frequency region abuts a second non-coupled side that is opposite to the second coupled side of the second touch screen display.

10. On a computing device comprising a first touch screen display comprising a first coupled side that is rotatably coupled to a second coupled side of a second touch screen display, a method comprising:
  at a first time:
    in the first touch screen display, providing a first signal having a first property to a first drive electrode in a first frequency region, and providing other signals having a second phase property different from the first property to other drive electrodes in other frequency regions; and
    in the second touch screen display, providing a second signal having the second property to a second drive electrode in a different frequency region, and providing additional signals having the first property to additional to drive electrodes in additional frequency regions,
  wherein the first frequency region and the other frequency regions are ordered by frequency in ascending or descending order from a first non-coupled side of the first touch screen display to the first coupled side of the first touch screen display, and
  wherein the different frequency region and the additional frequency regions in the second touch screen display are ordered by frequency in a same order as the order of the first frequency region and the other frequency regions from the second coupled side to a second non-coupled side of a second touch screen display.

11. The method of claim 10, wherein the first frequency region and one of the other frequency regions are adjacent to one another.

12. The method of claim 10, wherein the first property is a first phase and the second property is a second phase different from the first phase.

13. The method of claim 12, wherein frequencies provided to the drive electrodes in the first touch screen display are a first set of different frequencies, and frequencies provided to the drive electrodes in the second touch screen display are also the first set of different frequencies.

14. The method of claim 10, wherein the first frequency region abuts a first non-coupled side that is opposite to the first coupled side of the first touch screen display, and the different frequency region abuts a second non-coupled side that is opposite to the second coupled side of the second touch screen display.

15. A computing device, comprising:
   a processor;
   a memory storing instructions executable by the processor;
   a first touch screen display comprising,
      a first coupled side and a first non-coupled side that is opposite to the first coupled side,
      a first frequency region,
      a first drive electrode in the first frequency region,
      another frequency region located between the first frequency region and the first coupled side, and
      another drive electrode in the another frequency region; and
   a second touch screen display comprising,
      a second coupled side and a second non-coupled side that is opposite to the second coupled side,
      a different frequency region,
      a second drive electrode in the different frequency region,
      an additional frequency region located between the different frequency region and the second coupled side, and
      an additional drive electrode in the additional frequency region;
   wherein the first coupled side of the first touch screen display is rotatably coupled to the second coupled side of the second touch screen display; and
   wherein the instructions are executable to:
      at a first time:
         in the first touch screen display, provide a first signal having a first property to the first drive electrode in the first frequency region; and
         provide another signal having a second property different from the first property to the another drive electrode in the another frequency region of the first touch screen display; and
         in the second touch screen display, provide a second signal having the second property to the second drive electrode in the different frequency region; and
         provide an additional signal having the first property to the additional drive electrode in the additional frequency region of the second touch screen display.

16. The computing device of claim 15, wherein the first frequency region and the another frequency region are adjacent to one another.

17. The computing device of claim 15, wherein the first property is a first phase and the second property is a second phase different from the first phase.

18. The computing device of claim 17, wherein the instructions are executable to provide the first signal at a first frequency and the another signal at the first frequency.

19. The computing device of claim 17, wherein the instructions are executable to provide the first signal at a first frequency and the another signal at a different frequency.

20. The computing device of claim 15, wherein the first frequency region abuts the first non-coupled side that is opposite to the first coupled side of the first touch screen display, and the different frequency region abuts the second non-coupled side that is opposite to the second coupled side of the second touch screen display.

* * * * *